# (12) United States Patent
Karino et al.

(10) Patent No.: US 10,407,297 B2
(45) Date of Patent: Sep. 10, 2019

(54) FUELING APPARATUS

(71) Applicant: Tatsuno Corporation, Tokyo (JP)

(72) Inventors: Kazuyuki Karino, Tokyo (JP); Tsuyoshi Koike, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 21 days.

(21) Appl. No.: 15/457,453

(22) Filed: Mar. 13, 2017

(65) Prior Publication Data

US 2017/0283241 A1    Oct. 5, 2017

(30) Foreign Application Priority Data

Mar. 30, 2016  (JP) .................................. 2016-67449

(51) Int. Cl.
| | |
|---|---|
| *B67D 7/56* | (2010.01) |
| *B67D 7/04* | (2010.01) |
| *B67D 7/54* | (2010.01) |
| *B67D 7/78* | (2010.01) |
| *F16L 37/14* | (2006.01) |
| *F16L 37/33* | (2006.01) |

(Continued)

(52) U.S. Cl.
CPC ................. *B67D 7/56* (2013.01); *B67D 7/04* (2013.01); *B67D 7/0478* (2013.01); *B67D 7/3218* (2013.01); *B67D 7/54* (2013.01); *B67D 7/78* (2013.01); *F16L 37/146* (2013.01); *F16L 37/33* (2013.01); *F16L 39/00* (2013.01); *F16L 55/1007* (2013.01); *F16L 39/02* (2013.01)

(58) Field of Classification Search
CPC .......... B67D 7/56; B67D 7/04; B67D 7/0478; B67D 7/3218; B67D 7/54; B67D 7/78; F16L 37/146; F16L 37/33; F16L 39/00; F16L 55/1007; F16L 39/02

USPC ......................................................... 141/302
See application file for complete search history.

(56) References Cited

U.S. PATENT DOCUMENTS

| | | | | |
|---|---|---|---|---|
| 2,048,387 A | * | 7/1936 | Johnsen ................. | F16K 17/383 137/68.12 |
| 2,538,259 A | * | 1/1951 | Merriman ............. | F16L 37/096 137/351 |

(Continued)

FOREIGN PATENT DOCUMENTS

| | | |
|---|---|---|
| JP | H0551095 A | 2/1993 |
| JP | 2000130675 A | 5/2000 |
| JP | 2001114400 A | 4/2001 |

OTHER PUBLICATIONS

European Search Report for EP 17 16 1900, dated Jul. 6, 2017.

*Primary Examiner* — Timothy L Maust
*Assistant Examiner* — James R Hakomaki
(74) *Attorney, Agent, or Firm* — Stetina Brunda Garred and Brucker; Mark B. Garred (57) ABSTRACT

A fueling apparatus 1 including: a fueling pipe 4 accommodated in a housing main body 2 having a fueling mechanism, one end of the fueling pipe 4 being connected to the fueling mechanism; an elbow 5 connected to another end of the fueling pipe 4; a fueling hose 10, one end of which being connected to a fueling nozzle 11 with vapor recovering function, and in which a vapor passage 10c and a fuel oil passage 10d are separately disposed from each other; and a separable joint 9 for communicating the fuel oil passage 10d of the fueling hose 10 and inside of the elbow 5 with each other, and for communicating the vapor passage 10c of the fueling hose 10 and a vapor pipe 4 connected to the vapor recovery mechanism with each other.

10 Claims, 6 Drawing Sheets

(51) Int. Cl.
*B67D 7/32* (2010.01)
*F16L 39/00* (2006.01)
*F16L 55/10* (2006.01)
*F16L 39/02* (2006.01)

(56) References Cited

U.S. PATENT DOCUMENTS

| | | | | |
|---|---|---|---|---|
| 2,628,850 A * | 2/1953 | Summerville | ........ | F16L 37/096 137/595 |
| 3,719,194 A * | 3/1973 | Anderson | ............... | F16K 17/40 137/614.03 |
| 3,741,521 A * | 6/1973 | Tatsuno | ................... | F16L 25/00 137/68.15 |
| 4,064,889 A * | 12/1977 | Gayle | ................... | F16K 17/366 137/539 |
| 4,090,539 A | 5/1978 | Krupp | | |
| 4,131,142 A * | 12/1978 | Barr | ...................... | F16K 17/363 137/595 |
| 4,667,883 A * | 5/1987 | Fink, Jr. | ................ | B05B 1/3013 137/527 |
| 4,763,683 A * | 8/1988 | Carmack | ................. | F16L 37/32 137/594 |
| 4,827,960 A * | 5/1989 | Nitzberg | ............... | B67D 7/3218 137/68.15 |
| 4,827,977 A * | 5/1989 | Fink, Jr. | .............. | F16L 55/1015 137/614.04 |
| 4,872,471 A * | 10/1989 | Schneider | ........... | F16L 55/1007 137/68.14 |
| 4,899,792 A * | 2/1990 | Podgers | ................ | F16L 27/047 137/68.14 |
| 5,018,546 A * | 5/1991 | Carmack | ............. | F16L 55/1007 137/614.04 |
| 5,285,807 A * | 2/1994 | Nitzberg | ............... | F16L 55/1007 137/614.04 |
| 5,297,574 A | 3/1994 | Healy | | |
| 5,346,260 A * | 9/1994 | Meyer-Berg | ............. | B67D 7/42 285/1 |
| 5,363,889 A * | 11/1994 | Simpson | ................ | B67D 7/42 137/68.11 |
| 5,529,085 A * | 6/1996 | Richards | ................ | F16K 17/40 137/68.15 |
| 6,308,727 B1 * | 10/2001 | Healy | ................. | F16L 37/565 137/68.15 |
| 2013/0048110 A1 * | 2/2013 | Wolff | ................. | F16L 55/1007 137/512 |
| 2016/0238177 A1 * | 8/2016 | Clever | ..................... | B67D 7/40 |

* cited by examiner

FUELING APPARATUS

CROSS-REFERENCE TO RELATED APPLICATIONS

The present application claims priority to Japanese Patent Application No. 2016-67449 filed on Mar. 30, 2016, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a fueling apparatus, and more particularly to a fueling apparatus having vapor recovery function and a safety pipe joint for preventing breakage of a fueling hose and the like and leakage of fuel oil.

2. Description of the Related Art

Conventionally, in a fueling apparatus for supplying fuel oil with high volatility such as gasoline to a fuel tank of an automobile and the like, out of the fuel tank is flown fuel oil vapor corresponding to fueling amount. When the fuel oil vapor is released into the air, not only resources are wasted, but also there are possibilities of fire by ignition and environmental pollution. Then, as the applicant proposed in the Japanese Patent Publication No. 2001-114400, gasoline vapor flown out of the fuel tank at fueling was recovered to an underground tank.

On the other hand, in the Japanese Patent Publication 2000-130675 is proposed a safety pipe joint for preventing breakage of parts and leakage of fuel oil, wherein the first safety joint is connected to an elbow that is connected to a fueling pipe; the second safety joint is connected to a fueling hose; these first and second safety joints are connected with each other; and when an excessive tensile force is applied to the fueling hose, the first safety joint is separated from the second safety joint to close insides of these safety joints.

The contents of Japanese Patent Publication 2001-114400 and Japanese Patent Publication 2000-130675 are incorporated herein by reference in their entireties.

SUMMARY OF THE INVENTION

To impart vapor recovery function to a fueling apparatus having the safety pipe joint described in the Japanese Patent Publication 2000-130675, a fueling nozzle with vapor recovery function may be used, and the fueling hose, the first and second safety joints, the elbow and the like may be double pipe structures. But, when the double pipe structures are adopted, there is a problem that a sight glass for confirming flow of fuel oil cannot be mounted.

In addition, in the invention described in the Japanese Patent Publication 2001-114400, in a fueling hose disposed in the fueling apparatus, inside of a fuel oil passage needs to be positive pressure and inside of a vapor passage needs to be negative pressure, and in a safety pipe joint and the like, the vapor passage and the fuel oil passage need to be separated from each other by a seal structure, and the more elements with double pipe structures exist, the more risk of fuel oil leakage into the vapor passage goes up. When fuel oil actually leaks into the vapor passage, a suction pump of a vapor recovery mechanism may be broken, which causes trouble in business at a gas station.

Then, the present invention has been made in consideration of the above problems, and the object thereof is to allow installation of the sight glass, and to decrease a risk of fuel oil leakage in a fueling apparatus with vapor recovery function and a safety pipe joint.

In order to attain the above-mentioned object, a fueling apparatus of the present invention is characterized by having: a fueling pipe accommodated in a housing main body having a fueling mechanism, one end of the fueling pipe being connected to the fueling mechanism; an elbow connected to another end of the fueling pipe; a fueling hose, one end of which being connected to a fueling nozzle with vapor recovering function, and in which a vapor passage and a fuel oil passage are separately disposed from each other; and a separable joint for communicating the fuel oil passage of the fueling hose and inside of the elbow with each other, and for communicating the vapor passage of the fueling hose and a vapor pipe connected to the vapor recovery mechanism with each other.

With the present invention, the separable joint communicates the fuel oil passage of the fueling hose and the inside of the elbow with each other, and communicates the vapor passage of the fueling hose and the vapor pipe connected to the vapor recovery mechanism with each other, so that there is no necessity to adopt the elbow with double pipe structure, and it becomes possible to mount a sight glass to the elbow. In addition, a part that double pipe structure is required is decreased, which can decrease a risk of leaking fuel oil into the vapor passage.

In the above fueling apparatus, a safety pipe joint can be mounted between the fuel oil passage of the fueling hose and the elbow. Because of the existence of the separable joint, there is no necessity to adopt the safety pipe joint with double pipe structure, so that the risk of leaking fuel oil into the vapor passage is further decreased.

In the above fueling apparatus, the vapor pipe connected to the vapor passage of the separable joint can have a notch for breaking the vapor pipe when the safety pipe joint releases connection between the elbow and the separable joint, which can protect the separable joint and the like when an excessive tensile force is applied to the fueling hose.

In the above fueling apparatus, the vapor pipe connected to the vapor passage of the separable joint can have a connecting portion for dividing the vapor pipe into two parts when the safety pipe joint releases connection between the elbow and the separable joint, which can protect the separable joint and the like when an excessive tensile force is applied to the fueling hose.

As described above, with the present invention, it is possible to allow installation of the sight glass, and to decrease a risk of fuel oil leakage in a fueling apparatus with vapor recovery function and a safety pipe joint.

BRIEF DESCRIPTION OF THE DRAWINGS

FIGS. 3(a), 3(b) and 3(c) show the separable joint, safety pipe joint and others of the fueling apparatus shown in FIG. 1, wherein

FIGS. 4(a), 4(b) and 4(c) show the first variation of the separable joint and others shown in FIG. 3, wherein

FIGS. 5(a), 5(b) and 5(c) show the second variation of the separable joint and others shown in FIG. 3, wherein FIGS. 6(a), 6(b) and 6(c) show the third variation of the separable joint and others shown in FIG. 3, wherein

DETAILED DESCRIPTION

Next, an embodiment carrying out the present invention will be explained in detail with reference to the drawings.

Figure 1:
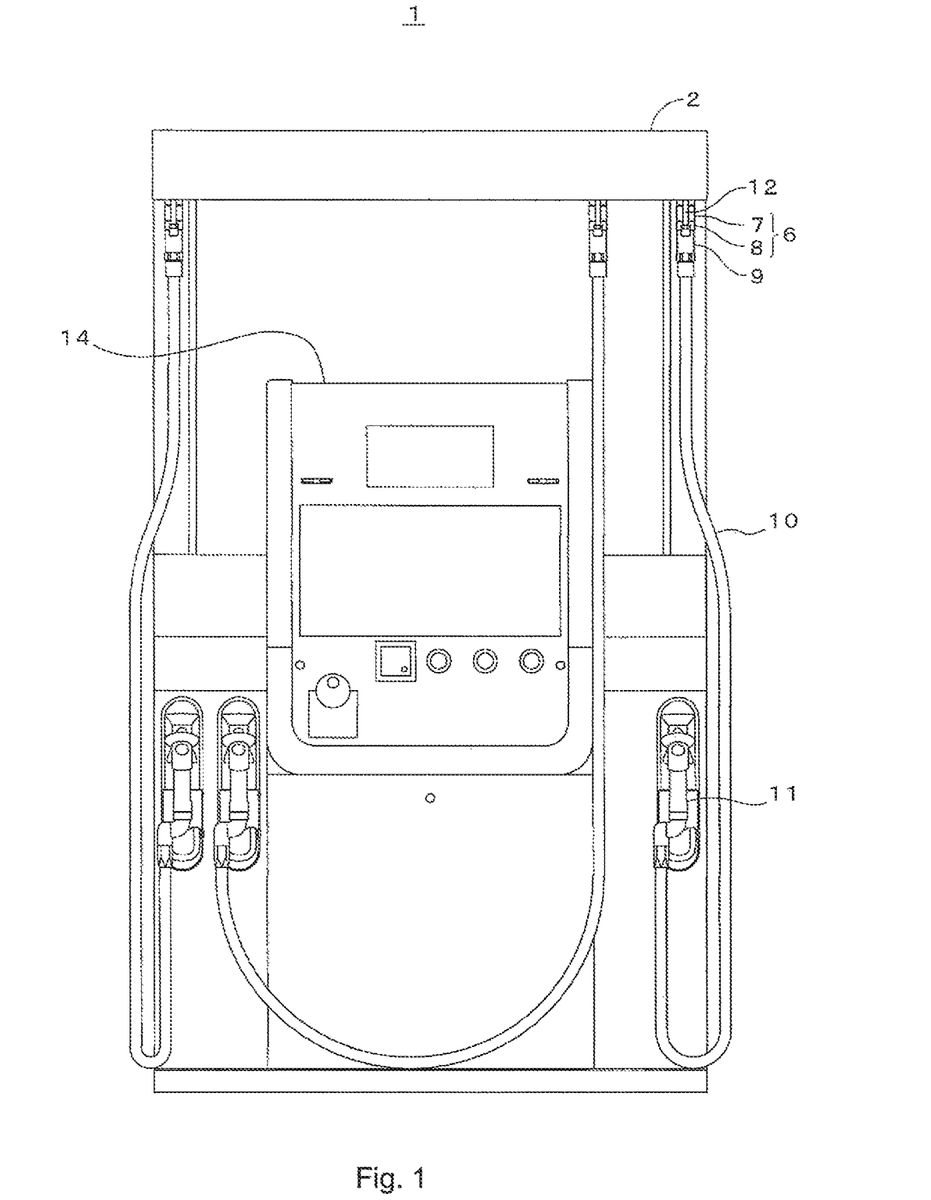
FIG. 1 is a front view showing a fueling apparatus according to an embodiment of the present invention.
Figure 2:
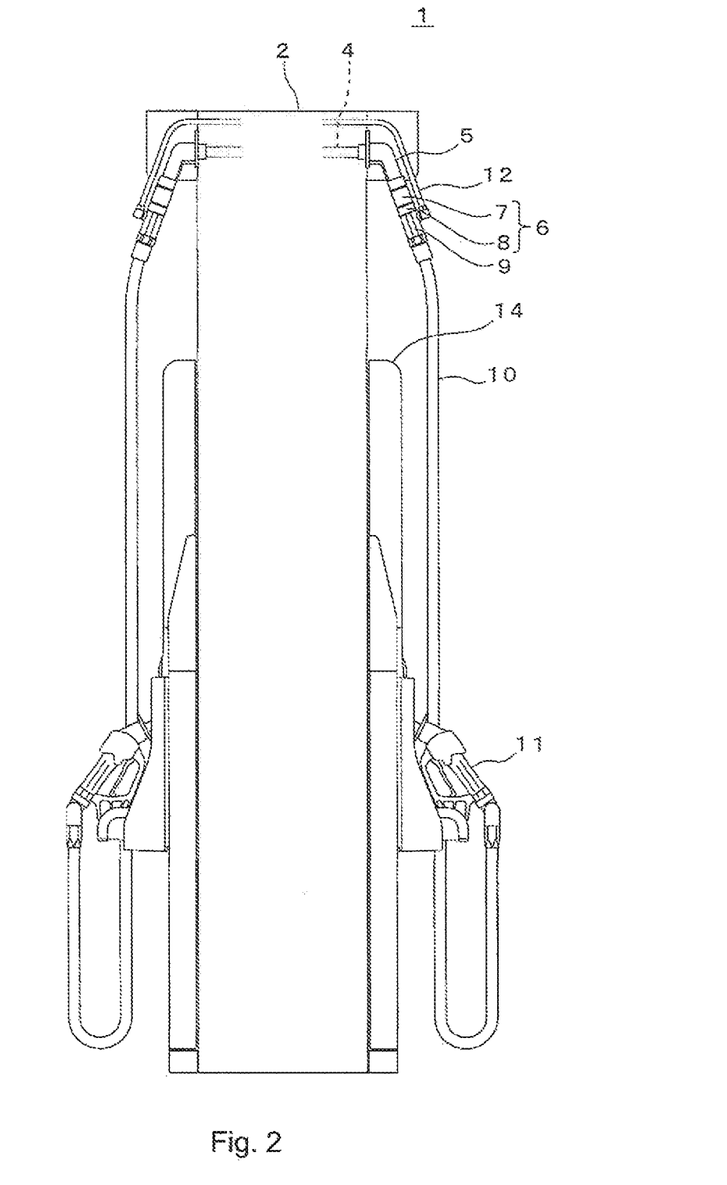
FIG. 2 is a left side view of the fueling apparatus shown in FIG. 1.

FIGS. 1 and 2 show a fueling apparatus according to an embodiment of the present invention, the fueling apparatus 1 includes: a housing main body 2 incorporating a fueling mechanism and a vapor recovery mechanism therein; a fueling pipe 4 accommodated in the housing main body 2, one end of which being connected to the fueling mechanism; an elbow 5 connected to the other end of the fueling pipe 4; a fueling hose 10 having a fueling nozzle 11 with vapor recovering function; a safety pipe joint 6 including the first safety joint 7 connected to the elbow 5 and the second safety joint 8; a separable joint 9 interposed between the safety pipe joint 6 and the fueling hose 10; a vapor pipe 12 connected to the vapor recovery mechanism; a display 14 and so on, and a set of the above devices is installed on the front side as well as on the back side shown in FIG. 1.

Figure 3A:
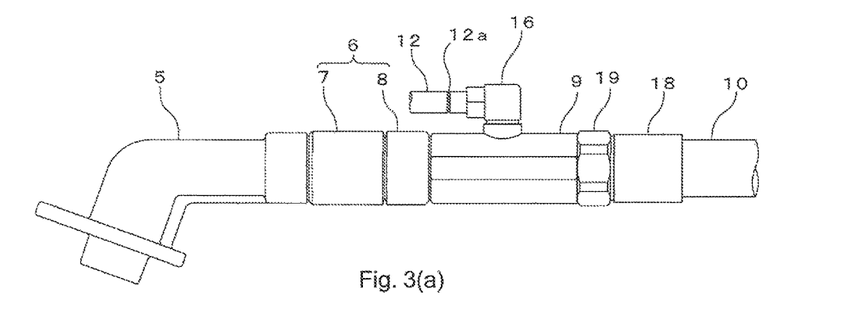
FIG. 3(a) is a front view.
Figure 3B:
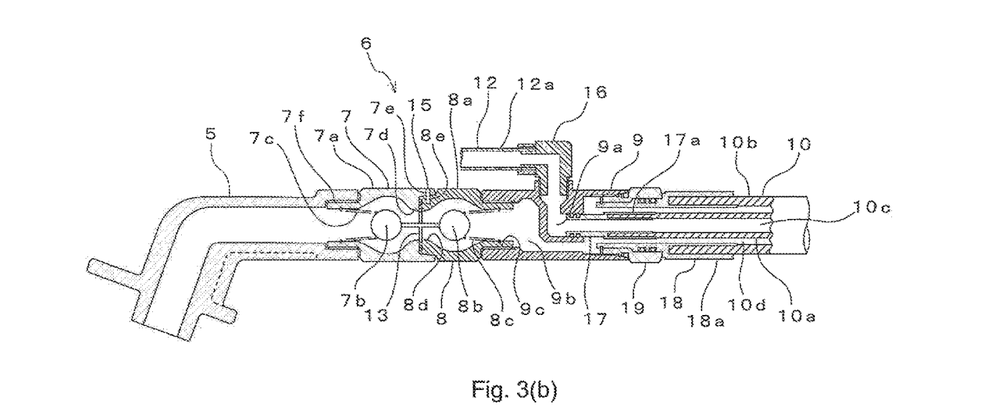
FIG. 3(b) is a longitudinally sectional view and FIG. 3(c) is a longitudinally sectional view showing a condition that the safety pipe joint is separated.

As shown in FIGS. 3(a) and 3(b), the first safety joint 7 includes: a main body 7a; a valve element 7b, which is a steel ball and is installed in the main body 7a; and a spring 7c for urging the valve element 7b toward a valve seat 7d; and the left end portion 7f joined to the right end portion of the elbow 5. In the same manner, the second safety joint 8 also includes: a main body 8a; a valve element 8b, which is a steel ball and is installed in the main body 8a; and a spring 8c for urging the valve element 8b toward a valve seat 8d. Then, between the valve elements 7b, 8b is mounted a holder 13 for holding opening state by separating the both valve elements 7b, 8b from the valve seats 7d, 8d respectively. To join the first and second safety joints 7, 8 with each other, a shear pin 15 is driven into small holes 7e, 8e drilled on the first and second safety joints 7, 8.

Inside the separable joint 9 are separately formed a vapor passage 9a and a fuel oil passage 9b from each other, and the vapor passage 9a is formed so as to extend to the side surface of the separable joint 9 from the right end thereof. The left end portion 9c of the separable joint 9 is joined to the right end portion of the second safety joint 8.

The separable joint 9 is connected to the fueling hose 10 by the connection metal fittings 17 to 19. The right end portion 17a of the first connection metal fitting 17 holds an inner pipe 10a of the fueling hose 10, and the left end portion of the first connection metal fitting 17 is inserted into the vapor passage 9a of the separable joint 9, and the vapor passage 9a of the separable joint 9 communicates with the vapor passage 10c of the fueling hose 10 with each other. Then, the right end portion 18a of the second connection metal fitting 18 holds an outer pipe 10b of the fueling hose 10, and the left end portion of the second connection metal fitting 18 is fixed to the inner peripheral surface of the separable joint 9 through the third connection metal fitting 19. With this, the fuel oil passage 9b of the separable joint 9 is in communication with a fuel oil passage 10d of the fueling hose 10. Between the first connection metal fitting 17 and the inner surface of the separable joint 9 and between the second connection metal fitting 18 and the third connection metal fitting 19 are interposed O rings to prevent fuel oil and vapor from leaking out.

As shown in FIGS. 1 to 3(c), to the side surface of the separable joint 9 is connected one end of the vapor pipe 12 by a joint 16, and the other end thereof is connected to the vapor recovery mechanism inside the housing main body 2. With this, vapor from the fueling hose 10 can be introduced to the vapor pipe 12 without the safety pipe joint 6. A part of the outer peripheral surface of the vapor pipe 12 is a notch 12a formed by notching all or a part of the outer peripheral surface in a circumference direction.

Next, separating motion and others of the safety pipe joint 6 and others of the fueling apparatus 1 with the above construction will be explained mainly with reference to FIGS. 3(a)-(c).

Figure 3C:
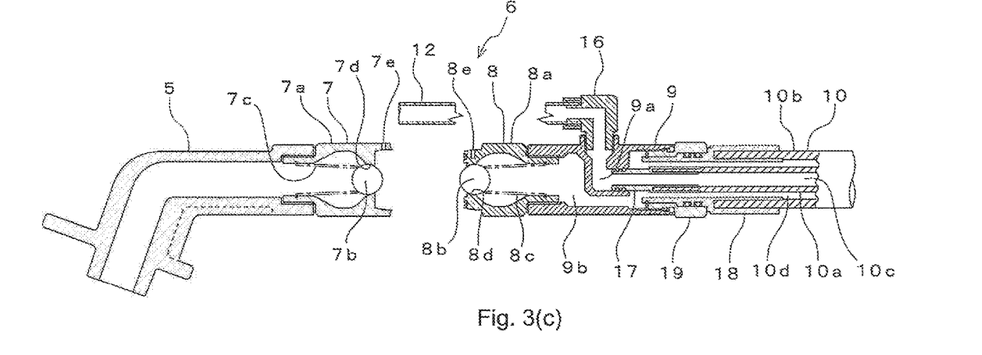

For example, with the fueling nozzle 11 (refer to FIG. 1) inserted to a fueling port of an automobile and the like moves the automobile, which applies excessive tensile forces and torsional moments to the first and second safety joints 7, 8 through the fueling hose 10, as shown in FIG. 3(c), the shear pin 15 (refer to FIG. 3(b)) is cut to separate the both joints 7, 8 from each other. Then, the holder 13, which has been held by the both joints 7, 8, is removed, which releases the opening state, which has been held by the valve elements 7b, 8b, is released, and the valve elements 7b, 8b are pressed by the springs 7c, 8c respectively, and the valve elements 7b, 8b are seated on the valve seats 7d, 8d respectively to close the valve. With this, even if the first and second safety joints 7, 8 were separated from each other, fuel oil would not flow out.

At the same time that the first and second safety joints 7, 8 are separated from each other, the vapor pipe 12 breaks at the position of the notch 12a. With this, the separable joint 9, the joint 16 and so on can be protected.

As described above, with the present embodiment, the separable joint 9 communicates the fuel oil passage 10d of the fueling hose 10 and inside of the elbow 5 with each other, and communicates the vapor passage 10c of the fueling hose 10 and the vapor pipe 12 connected to the vapor recovery mechanism with each other, so that there is no necessity to adopt the elbow 5 with double pipe structure. Therefore, although illustration is omitted, a sight glass can be mounted between the elbow 5 and the first safety joint 7, for instance. In addition, there is no necessity to adopt the first and second safety joints 7, 8 with double pipe structures, so that a risk of fuel oil leakage can be decreased.

Figure 4A:
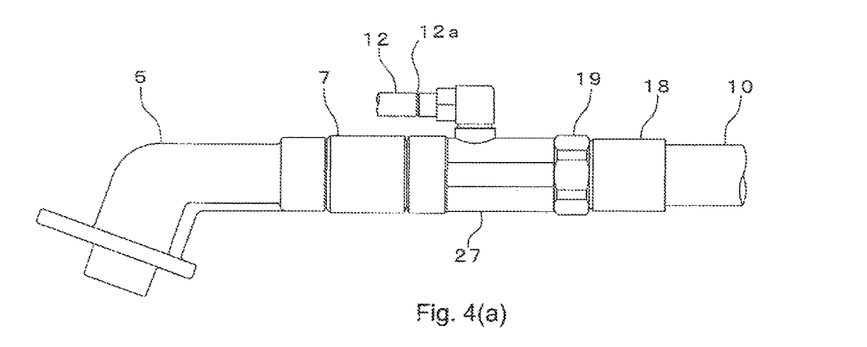
FIG. 4(a) is a front view.
Figure 4B:
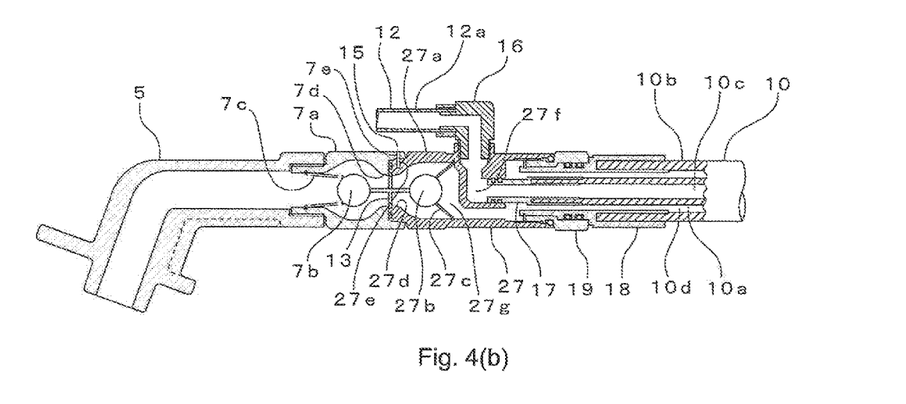
FIG. 4(b) is a longitudinally sectional view and FIG. 4(c) is a longitudinally sectional view showing a condition that the safety pipe joint is separated.
Figure 4C:
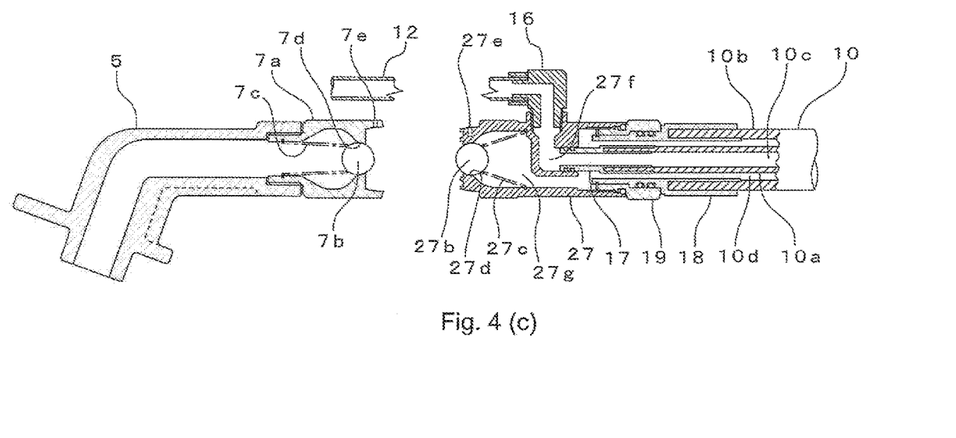

FIGS. 4(a)-(c) shows the first variation of the separable joint and the like shown in FIG. 3, in which an integrated joint 27 configured by integrally forming the second safety joint 8 and the separable joint 9 is installed. In addition, to the same elements as those shown in FIG. 3 are attached the same reference numbers to omit explanations thereof.

The integrated joint 27 includes: a main body 27a; a valve element 27b, which is a steel ball and is installed in the main body 27a; and a spring 27c for urging the valve element 27b toward a valve seat 27d. Between the valve element 7b of the first safety joint 7 and the valve element 27b of the integrated joint 27 is mounted a holder 13 for holding opening state by separating the both valve elements 7b, 27b from the valve seats 7d, 27d respectively. To join the integrated joint 27 and the first safety joint 7 with each other, the shear pin 15 is driven into small holes 27e, 7e drilled on the integrated joint 27 and the first safety joint 7.

Inside the integrated joint 27 are separately formed a vapor passage 27f and a fuel oil passage 27g from each other, and the vapor passage 27f is formed so as to extend to the side surface of the integrated joint 27 from the right end thereof. The integrated joint 27 is connected to the fueling hose 10 by the connection metal fittings 17 to 19.

When to the integrated joint 27 and the first safety joint 7 are applied excessive tensile forces or torsional moments through the fueling hose 10 respectively, as shown in FIG. 4(c), the shear pin 15 (refer to FIG. 4(b)) is cut to separate the both joints 7, 27. Then, the holder 13, which has been held by the both joints 7, 27, is removed, and the opening state, which has been held by the valve elements 7b, 27b, is released, and the valve elements 7b, 27b are pressed by the springs 7c, 27c respectively, and the valve elements 7b, 27b are seated on the valve seats 7d, 27d respectively to close the valve. With this, even if the both joints 7, 27 were separated from each other, fuel oil would not flow out.

In addition, at the same time that the both joints 7, 27 are separated from each other, the vapor pipe 12 breaks at the position of the notch 12a. With this, the integrated joint 27, the joint 16 and the like can be protected.

As described above, when the integrated joint 27 is used also, there is no necessity to adopt the elbow 5 with double pipe structure, and it becomes possible to mount a sight glass between the elbow 5 and the first safety joint 7, for instance. In addition, there is no necessity to adopt the first safety joint 7 with double pipe structure also, so that a risk of fuel oil leakage can be deceased. Further, using the integrated joint 27 configured by integrally forming the second safety joint 8 and the separable joint 9 as shown in FIGS. 3(a)-(c) can decrease the number of parts, and a risk of fuel oil leakage also.

Figure 5A:
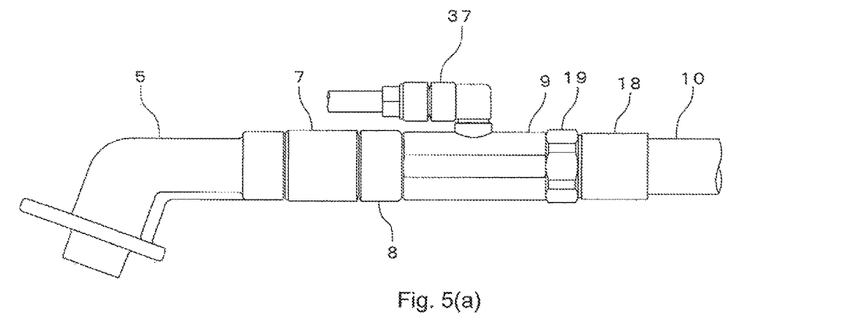
FIG. 5(a) is a front view.
Figure 5B:
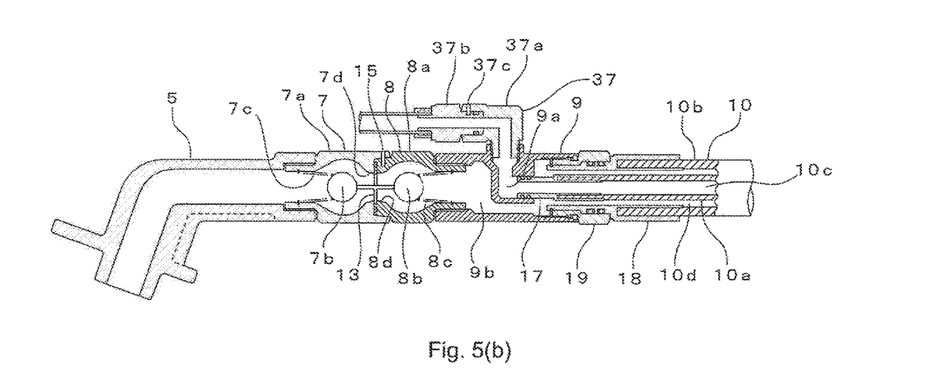
FIG. 5(b) is a longitudinally sectional view and FIG. 5(c) is a longitudinally sectional view showing a condition that the safety pipe joint is separated.
Figure 5C:
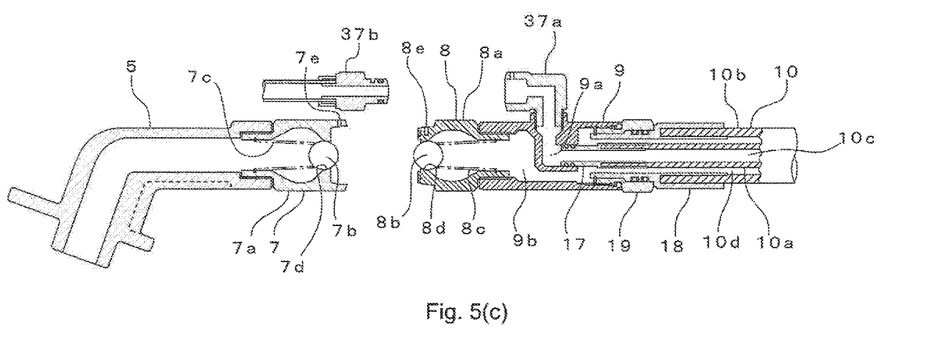

FIGS. 5(a)-(c) shows the second variation of the separable joint and the like shown in FIGS. 3(a)-(c), and in the variation, instead of the vapor pipe 12 shown in FIGS. 3(a)-(c), a vapor pipe 37 including a connecting portion 37a connected to the separable joint 9 and a main body 37b connected to the connecting portion 37a via a shear pin 37c is installed. In addition, to the same elements as those shown in FIGS. 3(a)-(c) are attached the same reference numbers to omit explanations thereof.

At the same time that the first and second pipe joints 7, 8 are separated from each other, the shear pin 37c is cut to separate the connecting portion 37a and the main body 37b of the vapor pipe 37 from each other. With this, the same effect as the above notch 12a can be obtained, and only replacement of the shear pin 37c allows the vapor pipe 37 to be repaired, which further decreases cost for replacing parts.

Figure 6A:
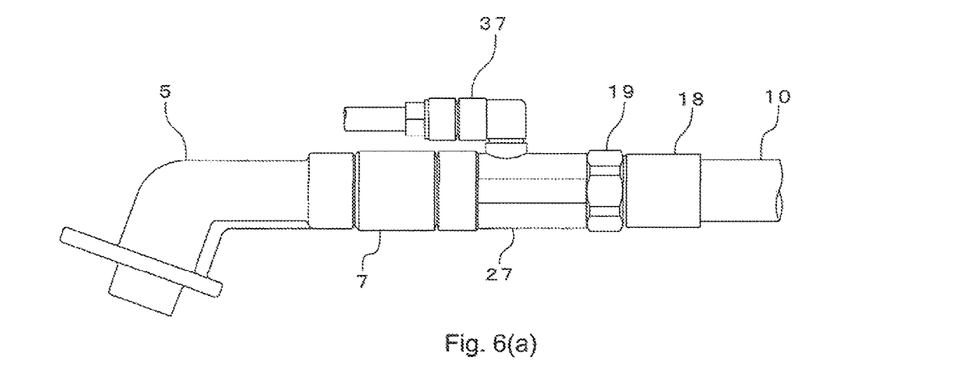
FIG. 6(a) is a front view.
Figure 6B:
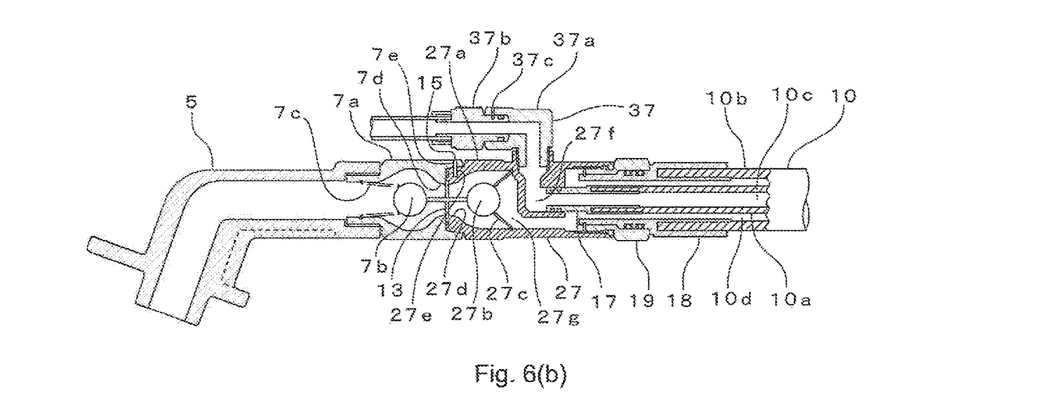
FIG. 6(b) is a longitudinally sectional view and FIG. 6(c) is a longitudinally sectional view showing a condition that the safety pipe joint is separated.
Figure 6C:
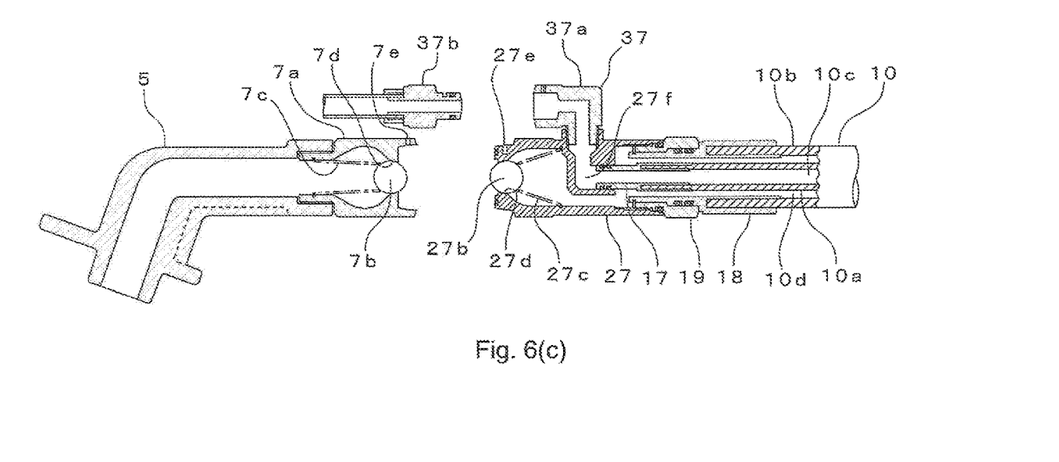

FIGS. 6(a)-(c) shows the third variation of the separable joint and the like show in FIGS. 3(a)-(c), and the variation is configured by combining the first and second variations shown in FIGS. 4(a)-(c) and 5(a)-(c), and in the variation, the integrated joint 27 configured by integrally forming the second pipe joint 8 and the separable joint 9, and the vapor pipe 37 including the connecting portion 37a connected to the integrated joint 27 and the main body 37b connected to the connecting portion 37a through the shear pin 37c are installed.

With the above construction, the sight glass can be mounted, and a risk of fuel oil leakage can be decreased, and the number of parts can be decreased.

Meanwhile, shape and connecting structure of each element explained in the above embodiment and each variation are merely examples, and any structure can be used as far as introducing vapor from the fueling hose to the vapor pipe connected to the vapor recovery mechanism through the vapor pipe connected to the separable joint, without the first and second safety joints and the elbow.

DESCRIPTION OF THE REFERENCE NUMERALS 1 fueling apparatus
2 housing main body
4 fueling pipe
5 elbow
6 safety pipe joint
7 first safety joint
7a main body
7b valve element
7c spring
7d valve seat
7e small hole
7f left end portion
8 second safety joint
8a main body
8b valve element
8c spring
8d valve seat
8e small hole
9 separable joint
9a vapor passage
9b fuel oil passage
9c left end portion
10 fueling hose
10a inner pipe
10b outer pipe
10c vapor passage
10d fuel oil passage
11 fueling nozzle
12 vapor pipe
12a notch
13 holder
14 display
15 shear pin
16 joint
17 first connection metal fitting
17a right end portion
18 second connection metal fitting
18a right end portion
19 third connection metal fitting
27 integrated joint
27a main body
27b valve element
27c spring
27d valve seat
27e small hole
27f vapor passage
27g fuel oil passage
37 vapor pipe
37a connecting portion
37b main body
37c shear pin

What is claimed is:

1. A fueling apparatus comprising:
   a fueling pipe accommodated in a housing main body having a fueling mechanism, one end of the fueling pipe being connected to the fueling mechanism;
   an elbow connected to another end of the fueling pipe;
   a fueling hose, one end of which being connected to a fueling nozzle with vapor recovering function, and in which a vapor passage and a fuel oil passage are separately disposed from each other;
   a safety pipe joint mounted between the fuel oil passage of the fueling hose and the elbow, the safety pipe joint including a first body coupled to the elbow, a second body coupled to the fueling hose and engageable with the first body, and a shear pin extending between the first body and the second body when the second body is engaged with the first body, the shear pin being breakable in response to a prescribed force being applied to the safety pipe joint to allow for disengagement of the second body from the first body; and
   a separable joint for communicating the fuel oil passage of the fueling hose and inside of the elbow with each other, and for communicating the vapor passage of the fueling hose and a vapor pipe connected to a vapor recovery mechanism with each other.

2. The fueling apparatus as claimed in claim 1, wherein the vapor pipe connected to the vapor passage of the separable joint has a notch for breaking the vapor pipe when the safety pipe joint releases connection between the elbow and the separable joint.

3. The fueling apparatus as claimed in claim 1, wherein the vapor pipe connected to the vapor passage of the separable joint has a connecting portion for dividing the vapor pipe into two parts when the safety pipe joint releases connection between the elbow and the separable joint.

4. The fueling apparatus as claimed in claim 1, wherein the first body includes a first hole and the second body includes a second hole aligned with the first hose when the second body is engaged with the first body, the shear pin being located within the first and second holes when the first body is engaged with the second body.

5. The fueling apparatus as claimed in claim 1, wherein the safety pipe joint further includes a first valve element moveable relative to the first body and a second valve element moveable relative to the second body.

6. The fueling apparatus as claimed in claim 5, wherein the first valve element is moveable relative to the first body between an open position and a closed position, fluid flow through the first body being restricted when the first valve element is in the closed position.

7. The fueling apparatus as claimed in claim 6, further comprising a spring operatively coupled to the first valve element to bias the first valve element toward the closed position.

8. The fueling apparatus as claimed in claim 7, wherein the safety pipe joint further includes a second valve element moveable relative to the first body and a second valve element moveable relative to the second body.

9. The fueling apparatus as claimed in claim 8, wherein the first valve element is moveable relative to the first body between an open position and a closed position, fluid flow through the first body being restricted when the first valve element is in the closed position.

10. The fueling apparatus as claimed in claim 9, further comprising a spring operatively coupled to the first valve element to bias the first valve element toward the closed position.

* * * * *